F. W. SCHMIDT.
GUARD ATTACHING BRACKET.
APPLICATION FILED SEPT. 27, 1910.
1,021,802.
Patented Apr. 2, 1912.
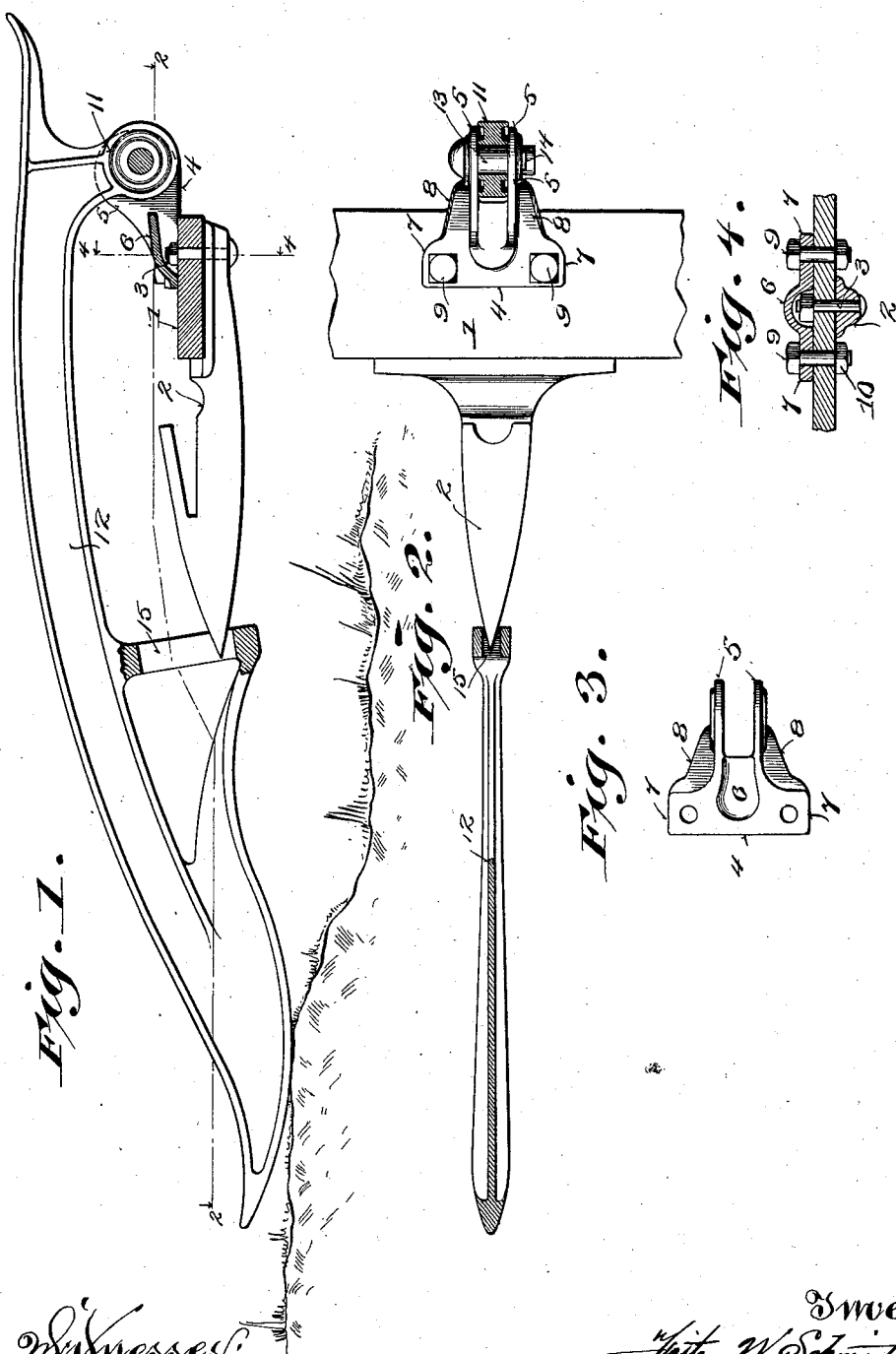

UNITED STATES PATENT OFFICE.

FRITZ W. SCHMIDT, OF NEW HOLSTEIN, WISCONSIN.

GUARD-ATTACHING BRACKET.

1,021,802.   Specification of Letters Patent.   Patented Apr. 2, 1912.

Application filed September 27, 1910. Serial No. 584,065.

*To all whom it may concern:*

Be it known that I, FRITZ W. SCHMIDT, a citizen of the United States, and resident of New Holstein, in the county of Calumet and State of Wisconsin, have invented certain new and useful Improvements in Guard-Attaching Brackets; and I do hereby declare that the following is a full, clear, and exact description thereof.

The object of my invention is to provide a simple, effective and economical hinge connection for pea guard attachments to harvesters, the construction and arrangement of the device being such that the guard is free to oscillate upon a pintle carried by ears of the bracket, which bracket constitutes my invention and is secured to the finger bar of a harvester upon opposite sides of the harvester finger attaching bolt, the bolt being nested within a housing with which the bracket is provided.

With the above objects in view the invention consists in certain peculiarities of construction and combination of parts to be fully set forth hereinafter with reference to the accompanying drawings and subsequently claimed.

In the drawings Figure 1 represents a sectional elevation of a bracket embodying the features of my invention, the bracket being illustrated in connection with a finger bar of a harvester with the usual guards in hinge connection with said bracket; Fig. 2, a sectional plan view of the same as indicated by line 2—2 of Fig. 1; Fig. 3, an inverted detail plan view of the bracket detached, said view showing the pocket or housing which is adapted to fit over the guard finger retaining bolt, and Fig. 4, a detail cross-section as indicated by line 4—4 of Fig. 1.

Referring by characters to the drawings, 1 indicates a portion of a finger bar to which is attached the usual series of guard fiingers 2 (only one of which is shown) the guard fingers being secured to said bar by means of a standard bolt and nut connection 3. Fitted over the nut and bolt connection 3 is a bracket 4, which bracket comprises a pair of apertured ears 5 that are spaced apart and connected by a housing web 6, the web being arranged with a centrally disposed pocket that incases the guard finger retaining bolt. The bracket is also provided with apertured feet 7, which extend from the ears 5 and are also connected thereto by ribs 8. These ears are disposed upon opposite sides of the housing web and are provided to receive retaining bolts 9, which bolts pass through said ears and apertures in the finger bar, being held in place by suitable nuts 10, whereby the bracket is securely held and, as shown by Fig. 4, the said bolts thus straddle the rear end of the guard finger.

Secured between the ears 5 of the brackets is a hub extension 11 of a pea-guard 12, the hub extension being provided with an aperture through which a headed stud 13 is fitted, the stud being also passed through the apertures of said ears and retained by split key 14. The pea-guard thus hinged is provided with the usual forwardly disposed slot 15, into which the end of the guard finger extends, said slot permitting oscillatory movement of the pea-guard incidental to its travel upon uneven ground, whereby the point of the guard is rendered effective in lifting tangled pea vines or fallen grain.

From the foregoing description it will be seen that by utilizing a bracket of this character the pea-guard is held rigidly in a lateral direction, while at the same time oscillatory movement is had, the bracket being so constructed and arranged that the guard finger retaining bolt is housed and all parts so formed that the bracket will not present any sharp corners or obstructions into which pea vines or grain may lodge. Furthermore, by this construction the guard fingers are not disturbed when the pea-guard is attached to the harvester, the finger bar being simply provided with apertures upon opposite sides of the guard finger for the reception of the bracket retaining bolts.

I claim:

In a harvester having a finger bar, a guard finger fitted to the finger bar, and a retaining bolt for the guard finger; the combination of a bracket comprising vertically disposed parallel apertured ears, a housing web connecting the ears provided with a pocket for incasing the guard finger retaining bolt, horizontally disposed apertured feet extending from the bracket ears and arranged to straddle the guard finger bolt, independent bracket retaining bolts connecting the feet and finger bar upon opposite sides of its shank portion, an oscillatory guard having a hub extension pivotally mounted between the bracket ears, the oscillatory guard being provided with a forwardly disposed slot adapted to receive the point of the guard finger.

In testimony that I claim the foregoing I have hereunto set my hand at New Holstein in the county of Calumet and State of Wisconsin in the presence of two witnesses.

FRITZ W. SCHMIDT.

Witnesses:
JACOB C. SCHMIDT,
FREDERICK BULLWINKEL.

Copies of this patent may be obtained for five cents each, by addressing the "Commissioner of Patents, Washington, D. C."